United States Patent
Yamada

(10) Patent No.: US 11,049,470 B2
(45) Date of Patent: Jun. 29, 2021

(54) OPTIMIZED DISPLAY OF TRANSFERRED SCREEN DATA BASED ON A USER OPERATION STATE

(71) Applicant: FUJITSU LIMITED, Kawasaki (JP)

(72) Inventor: Kohji Yamada, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/808,449

(22) Filed: Mar. 4, 2020

(65) Prior Publication Data
US 2020/0294464 A1    Sep. 17, 2020

(30) Foreign Application Priority Data
Mar. 13, 2019   (JP) .............................. JP2019-045685

(51) Int. Cl.
*G09G 5/00*     (2006.01)
*H04L 29/06*    (2006.01)

(52) U.S. Cl.
CPC .............. *G09G 5/001* (2013.01); *H04L 67/42* (2013.01); *G09G 2310/04* (2013.01); *G09G 2320/0223* (2013.01); *G09G 2320/103* (2013.01); *G09G 2340/0435* (2013.01); *G09G 2350/00* (2013.01)

(58) Field of Classification Search
CPC ............... G09G 5/001; G09G 2350/00; G09G 2310/04; G09G 2320/0223; G09G 2340/0435; G09G 2320/103; G06T 9/00; G06F 3/1454; H04L 67/42; H04N 21/44218; H04N 21/44004
See application file for complete search history.

(56) References Cited

U.S. PATENT DOCUMENTS

2012/0144397 A1* 6/2012 Imai .................... G09G 5/14
                                                       718/103

FOREIGN PATENT DOCUMENTS

| JP | 2012-118881 | A |   | 6/2012 |            |
|----|-------------|---|---|--------|------------|
| JP | 2017-049625 | A |   | 3/2017 |            |
| JP | 2017049625  | A | * | 3/2017 | G06F 13/00 |

* cited by examiner

*Primary Examiner* — Maurice L. McDowell, Jr.
*Assistant Examiner* — Donna J. Ricks
(74) *Attorney, Agent, or Firm* — Fujitsu Patent Center

(57) ABSTRACT

An apparatus receives pieces of image data of respective frames from a server apparatus, where each of the pieces of image data represents a display screen reflecting a result of processing corresponding to an input operation performed on the apparatus. The apparatus, in response to reception of a piece of image data of a first frame among the frames from the server apparatus, controls a display timing of the first frame, based on an occurrence state of an input operation on the apparatus.

9 Claims, 13 Drawing Sheets

OPTIMIZED DISPLAY OF TRANSFERRED SCREEN DATA BASED ON A USER OPERATION STATE

CROSS-REFERENCE TO RELATED APPLICATION

This application is based upon and claims the benefit of priority of the prior Japanese Patent Application No. 2019-45685, filed on Mar. 13, 2019, the entire contents of which are incorporated herein by reference.

FIELD

The embodiments discussed herein are related to optimized display of transferred screen data based on a user operation state.

BACKGROUND

There is known thin client technology that minimizes processing performed by a client terminal and causes a server to perform most of the processing. In particular, client technology called a "screen transfer type" is widely used in which a screen indicating a result of processing performed by a server is transferred to a client terminal as image data. For example, image data of a desktop screen generated by the server is transferred to the client terminal by using remote desktop technology.

As an example of the thin client technology of the screen transfer type, a following system has been proposed. In this system, a server-side computer sets, for each of sections of an image to be transmitted, degrees of association between the section and the other sections; sets a higher priority for an operation-target section and a section having the highest degree of association with the operation-target section than the other sections; and transmits images of the sections in descending order of priority.

As an example of the related art, a following image output apparatus has been proposed. The image output apparatus receives state information indicating an editing state of a partial content from an information processing terminal and updates a displayed image at a timing when the editing of the partial content is completed.

The related art is described in, for example, Japanese Laid-open Patent Publication No. 2012-118881 and Japanese Laid-open Patent Publication No. 2017-49625.

SUMMARY

According to an aspect of the embodiments, an apparatus receives pieces of image data of respective frames from a server apparatus, where each of the pieces of image data represents a display screen reflecting a result of processing corresponding to an input operation performed on the apparatus. The apparatus, in response to reception of a piece of image data of a first frame among the frames from the server apparatus, controls a display timing of the first frame, based on an occurrence state of an input operation on the apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, two methods described below are conceivable a a method for displaying, on a client terminal, a display screen transferred from a server in a thin client system of the screen transfer type.

The first method is a method for displaying, upon receipt of image data of a display screen, the display screen based on the image data as soon as possible. This method successfully reduces the response time from when an input operation is, performed on the client terminal to when the display screen reflecting the input operation is displayed, thus improving the operability for the user. On the other hand an interval at which the display screen is displayed may vary in some cases depending on the load situation of a network between the server and the client terminal. In such a case, the display result is not smooth and is unnatural.

The second method is a method for buffering, upon receipt of image data of a display screen, the image data and then displaying the display screen based on the image data at a timing synchronized with a frame period. This method makes the display result smooth and natural since the display screen is displayed at a regular interval. On the other hand, the response to the input operation becomes slower as the image data is buffered, resulting in reduced operability.

In one aspect, it is desirable to optimize a method for displaying transferred display data in accordance with a state of a user operation.

Embodiments of the present disclosure will be described below with reference to the accompanying drawings.

First Embodiment

Figure 1:
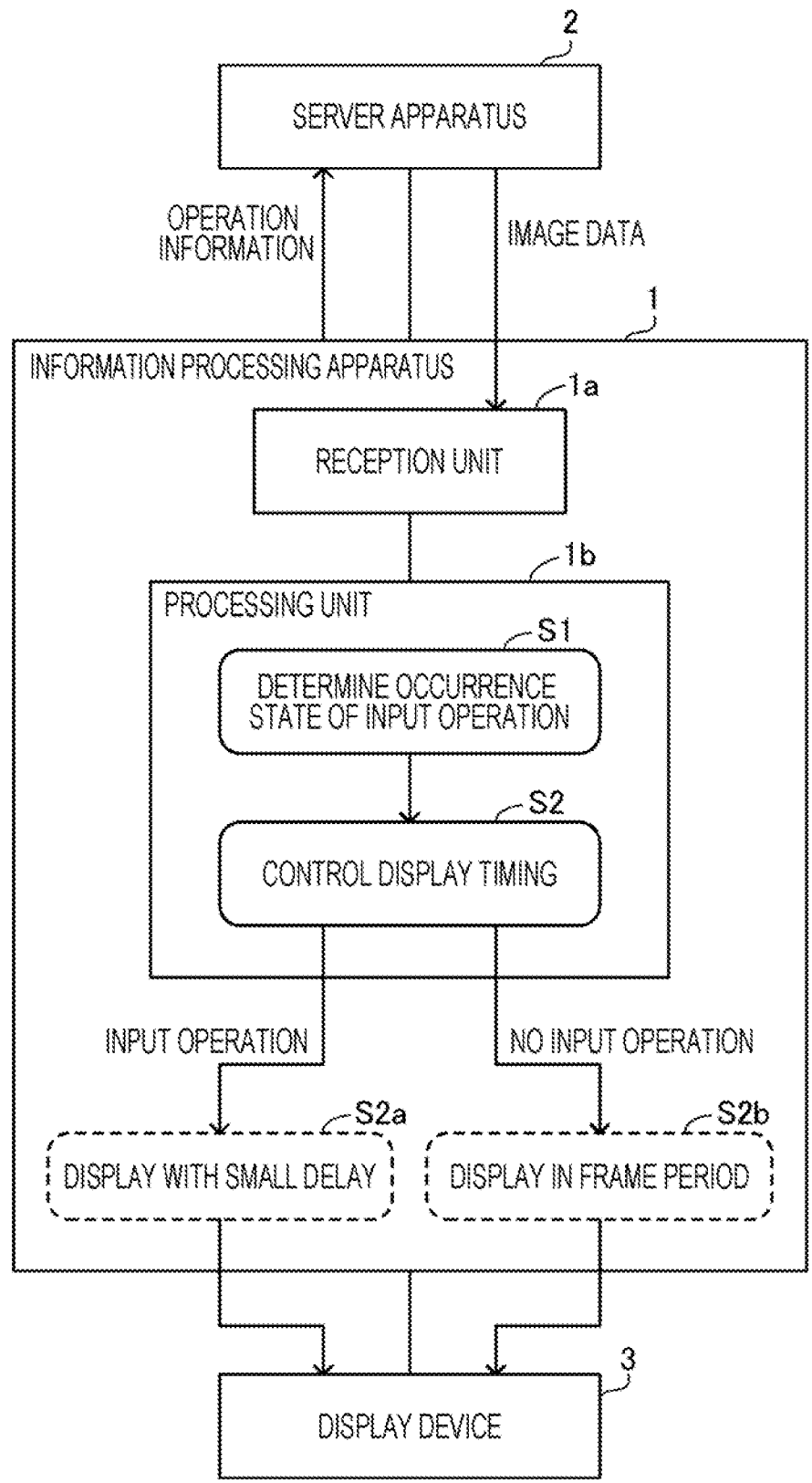
FIG. 1 is a diagram illustrating an example of a configuration and an example of a process of an image transfer system according to a first embodiment.

FIG. 1 is a diagram illustrating an example of a configuration and an example of a process of an image transfer system according to a first embodiment. The image transfer system illustrated in FIG. 1 includes an information processing apparatus 1 and a server apparatus 2. A display device, is is coupled to the information processing apparatus 1.

In this image transfer system, the information processing apparatus 1 transmits, in response to an input operation performed by a user, operation information indicating contents of the input operation to the server apparatus 2. The server apparatus 2 transmits, as image data, a display screen reflecting a result of processing corresponding to the input operation indicated by the received operation information to the information processing apparatus 1. The information processing apparatus 1 causes the display device 3 to display a display screen based on the received image data. In this way, the image transfer system causes the information processing apparatus 1 to display a result of processing actually performed by another device such as the server apparatus 2 or data held in the other device and allows the information processing apparatus 1 to behave as if the information processing apparatus 1 itself performed the processing or held the data.

The display screen is, for example, a desktop image or an application execution screen. The display screen includes an image for accepting an input operation such as a graphical user interface (GUI) image.

The information processing apparatus 1 includes a reception unit 1a and a processing unit 1b. The reception unit 1a is implemented by a communication interface, for example. The processing unit 1b is implemented by a processor, for example.

The reception unit 1a receives the image data of the display screen that is transmitted from the server apparatus 2 for each frame. When the reception unit 1a receives image data of a certain frame (referred to as a "received frame"), the processing unit 1b determines an occurrence state of an input operation on the information processing apparatus 1 (step S1). The processing unit 1b controls a display timing of the received frame, based on the determined occurrence state (step S2). In this way, the information processing apparatus 1 successfully optimizes the method for displaying a display screen transferred from the server apparatus 2 in accordance with a state of a user operation.

In the processing of step S1, the processing unit 1b determines whether or not an input operation is performed on the information processing apparatus 1 in a period from generation of a frame (previous frame) immediately preceding the received frame to generation of the received frame performed by the server apparatus 2, for example. Alternatively, the processing unit 1b may determine whether or not an input operation is performed on the information processing apparatus 1 in a period from reception of the previous frame to reception of the received frame. In this way, the processing unit 1b determines whether or not an input operation has occurred for the received frame.

In the processing of step S2, for example, the processing unit 1b causes the received frame to be displayed with a small delay (step S2a) if the input operation has occurred, and causes the received frame to be in synchronization with a certain frame period (step S2b) if no input operation has occurred. For example, in step S2b, the processing unit 1b temporarily buffers the image data of the received frame, then reads the image data, and causes the received frame based on the image data to be displayed at a timing synchronized with the frame period. On the other hand, in step S2a, the processing unit 1b causes the received frame to be displayed without buffering the image data of the received frame. In step S2a, the received frame is displayed as soon as possible without waiting for the timing synchronized with the frame period.

For example, in a situation where an input operation has occurred, it is desirable that the response of displaying, to the input operation, the display screen reflecting the processing result corresponding to the input operation be fast. Therefore, in the situation where an input operation has occurred, the processing unit 1b selects the method of step S2a to make the display timing of the frame sooner than in the situation where no input operation has occurred. However, the display interval of the frames possibly varies in the method of step S2a, resulting in unnatural display. Thus, in the situation where no input operation has occurred, the processing unit 1b selects the method of step S2b to adjust the display timing of the frame to match the frame period. This enables smooth and natural display.

In this manner, the information processing apparatus 1 is capable of adaptively switching between the frame display methods in accordance with the occurrence state of an input operation. Consequently, the information processing apparatus 1 successfully achieves both improved operability resulting from a high-speed display response and improved image display quality.

Second Embodiment

Figure 2:
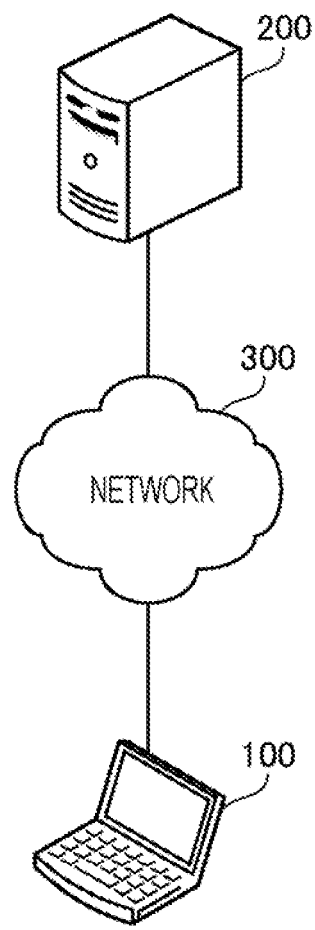
FIG. 2 is a diagram illustrating an example of a configuration of a thin client system according to a second embodiment.

FIG. 2 is a diagram illustrating an example of a configuration of a thin client system according to a second embodiment. The thin client system illustrated in FIG. 2 includes a server apparatus 200 and a client terminal 100. The server apparatus 200 and the client terminal 100 are coupled to each other via a network 300. The server apparatus 200 and the client terminal 100 are examples of the server apparatus 2 and the information processing apparatus 1 illustrated in FIG. 1, respectively.

In this thin-client system, the client terminal 100 transmits, in response to an operation performed by a user, operation information indicating contents of the operation to the server apparatus 200. The server apparatus 200 preforms processing corresponding to the received operation information, and transfers, as image data, a screen indicating a result of the processing to the client terminal 100. In this way, the thin client system causes the client terminal 100 to display a result of processing actually performed by the server apparatus 200 or information held in the server apparatus 200 and allows the client terminal 100 to behave as if the client terminal 100 itself performed the processing or held the information.

The server apparatus 200 executes a program of a screen transfer control application for accepting operation information from the client terminal 100 and transferring image data of a screen indicating a processing result corresponding to the operation information to the client terminal 100. The server apparatus 200 also executes, for example, programs of a web browsing application, a word processing application, a moving image editing application, and so on, as applications for performing processing corresponding to the operation information. These applications are applications remotely used by a user of the client terminal 100, and are hereinafter referred to as "user applications".

A user application generates a desktop screen in which a screen of the user application for performing processing corresponding to operation information, such as a screen of a web browser or a screen for a word processor or for a moving image editor, is incorporated. The screen transfer control application transfers image data of the generated desktop screen to the client terminal 100. The image data of the desktop screen is compressed before being transferred.

On the other hand, the client terminal 100 causes the display device to display the desktop screen based on the image data received from the server apparatus 200, and executes the program of the screen display control application for transmitting operation information to the server apparatus 200 in response to a user operation. A screen of the user application, such as a web browsing application, a word processing application, or a moving image editing application is incorporated in the displayed desktop screen. Therefore, regardless of the fact that the programs of these user applications are not executed on the client terminal 100, the user is able to use these user applications by operating the client terminal 100.

FIG. 2 illustrates an example in which a single client terminal 100 is coupled to the server apparatus 200. Alternatively, a plurality of client terminals 100 may be coupled to the server apparatus 200.

In the present embodiment, the client terminal 100 is capable of switching between two display modes for displaying an image (desktop image) of the desktop screen, that is, switching between a "small-delay display mode" and a "synchronous display mode". The small-delay display mode is a display mode in which the desktop image is displayed with a small delay. In the small-delay display mode, upon receiving and decoding (decompressing) data of the desktop image, the client terminal 100 immediately displays the desktop image. In contrast, the synchronous display mode is a display mode in which the desktop image is displayed in synchronization with a frame period of a regular time interval. In the synchronous display mode, the client terminal 100 temporarily buffers the decoded image data of the desktop image and then reads the image data to display consecutive desktop images at a regular period.

In the small-delay display mode, the response of displaying, to a user operation, the desktop image reflecting the user operation is fast. However, depending on a condition of the network 300 over which the image data is transmitted, the display period of the consecutive desktop images may vary in some cases. In such cases, the images are not displayed smoothly, causing the user to visually feel strange. On the other hand, in the synchronous display mode, the images are displayed smoothly and the user does not visually feel strange. However, the display response of the desktop image to a user operation becomes slower by an amount by which the image data is buffered.

In the present embodiment, the client terminal 100 determines which of the display modes described above is appropriate, based on at least a state of a user operation, and adaptively switches the display mode. In this way, the client terminal 100 improves the display response of the desktop image to a user operation while displaying the desktop image as smoothly and naturally as possible.

<Hardware Configuration>

Figure 3:
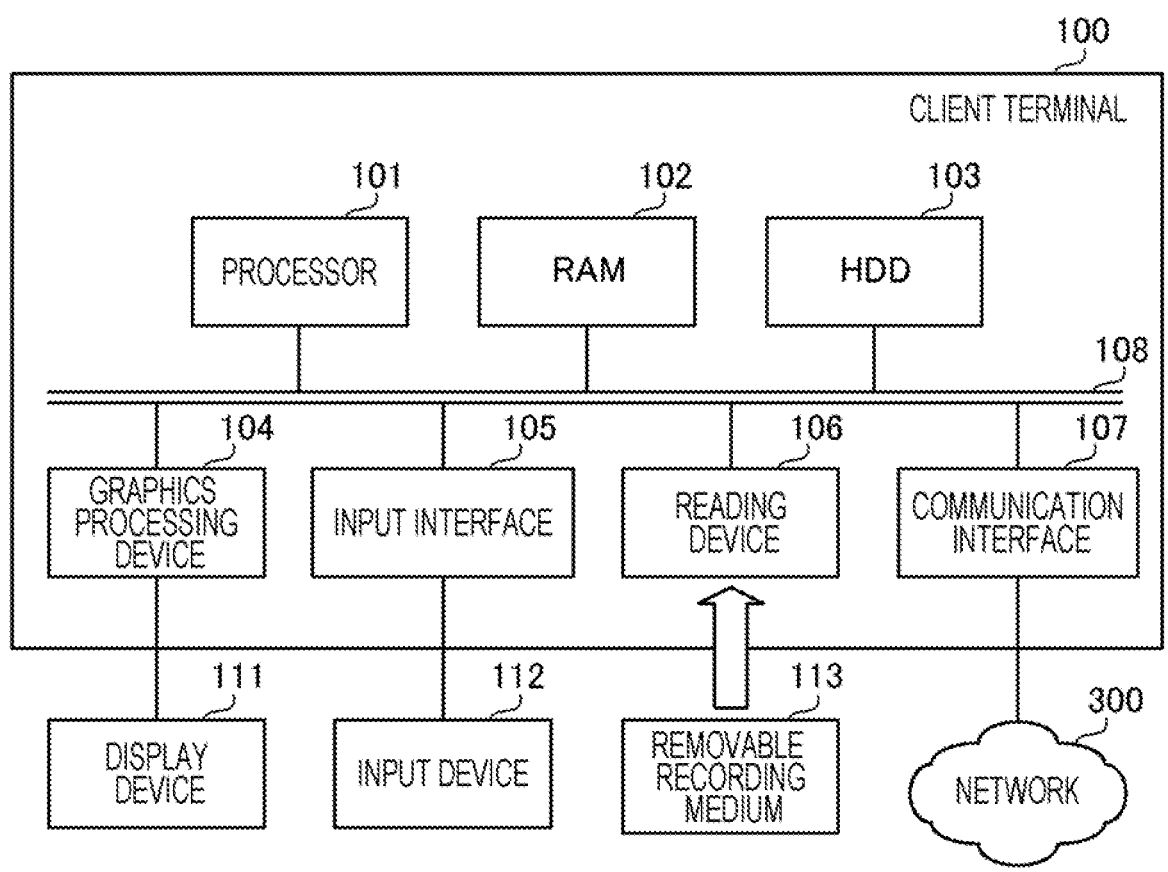
FIG. 3 is a diagram illustrating an example of a hardware configuration of a client terminal.

FIG. 3 is a diagram illustrating an example of a hardware configuration of the client terminal. The client terminal 100 is implemented by a computer illustrated in FIG. 3, for example.

The entire client terminal 100 is controlled by a processor 101. The processor 101 may be a multiprocessor. The processor 101 may be, for example, a central processing unit (CPU), a microprocessor unit (MPU), a digital signal processor (DSP), an application-specific integrated circuit (ASIC), a graphics processing unit (GPU), or a programmable logic device (PLD). Alternatively, the processor 101 may be a combination of two or more elements among a CPU, an MPU, a DSP, an ASIC, a GPU, and a PLD.

A random-access memory (RAM) 102 and a plurality of peripheral devices are coupled to the processor 101 via a bus 108.

The RAM 102 is used as a main storage device of the client terminal 100. At least part of an operating system (OS) program and an application program to be executed by the processor 101 is temporarily stored in the RAM 102. Various kinds of data used in processing performed by the processor 101 are also stored in the RAM 102.

Examples of the peripheral devices coupled to the bus 108 include a hard disk drive (HDD) 103, a graphics processing device 104, an input interface 105, a reading device 106, and a communication interface 107.

The HDD 103 is used as an auxiliary storage device of the client terminal 100. An OS program, an application program, and various kinds of data are stored in the HDD 103. Another kind of nonvolatile storage device such as a solid state drive (SSD) may be used as the auxiliary storage device.

A display device 111 is coupled to the graphics processing device 104. The graphics processing device 104 causes an image to be displayed on a screen of the display device 111 in accordance with an instruction given by the processor 101. Examples of the display device 111 include a liquid crystal display and an organic electroluminescence (EL) display.

An input device 112 is coupled to the input interface 105. The input interface 105 transmits, to the processor 101, a signal output from the input device 112, Examples of the input device 112 include a mouse, a touch panel, a tablet, a touchpad, and a trackball.

A removable recording medium 113 is removably coupled to the reading device 106. The reading device 106 reads data stored on the removable recording medium 113 and transmits the data to the processor 101. Examples of the removable recording medium 113 include an optical disc, a magneto-optical disk, and a semiconductor memory.

The communication interface 107 is coupled to the network 300, and transmit and receives data to and from other devices such as the server apparatus 200.

The hardware configuration described above successfully implements processing functions of the client terminal 100. The server apparatus 200 may also be implemented by the computer illustrated in FIG. 3.

<Functional Blocks>

Figure 4:
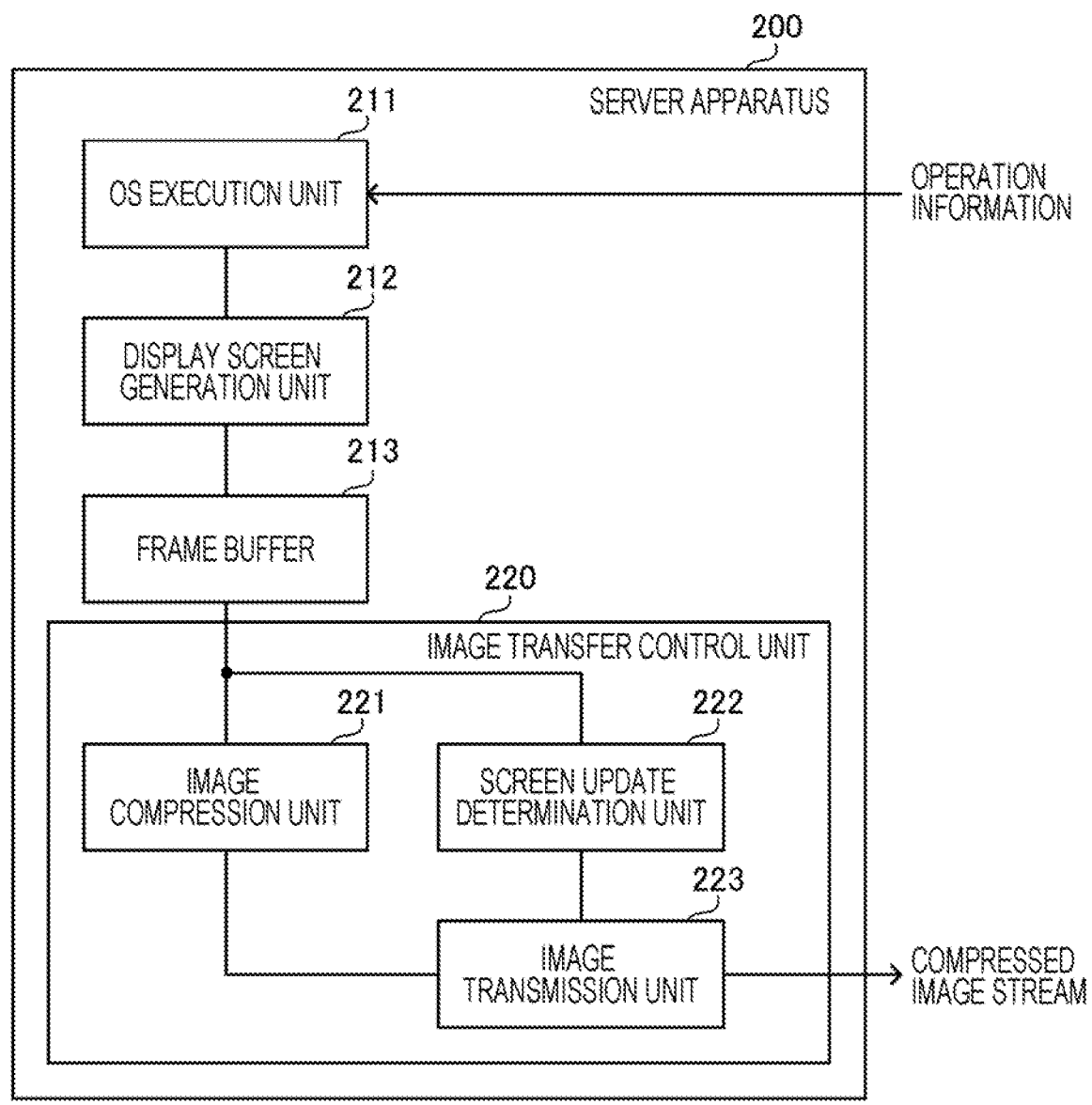
FIG. 4 is a block diagram illustrating an example of a configuration of processing functions of a server apparatus.

FIG. 4 is a block diagram illustrating an example of a configuration of processing functions of the server apparatus. The server apparatus 200 includes an OS execution unit 211, a display screen generation unit 212, a frame buffer 213, and an image transfer control unit 220. Processing performed by the OS execution unit 211, the display screen generation unit 212, and the image transfer control unit 220 is implemented, for example, as a result of a processor (not illustrated) included in the server apparatus 200 executing a certain program. In particular, the processing performed by the image transfer control unit 220 is implemented by the program of the screen transfer control application described above.

The OS execution unit 211 controls execution of the OS. For example, the OS execution unit 211 detects an instruction for starting a user application or a command for the user application, based on operation information transmitted from the client terminal 100. For example, when detecting double-clicking of an icon of a user application, the OS execution unit 211 instructs the display screen generation unit 212 to start the user application corresponding to the icon. In another example, when detecting an operation for requesting execution of a command on an operation screen of the running user application, that is, on a window, the OS execution unit 211 instructs the display screen generation unit 212 to execute the command.

The operation information transmitted from the client terminal 100 to the server apparatus 200 includes an operation type, for example. Examples of the operation type include pressing of any of a left cursor key, a right cursor key, an up cursor key, a down cursor key, a page up key, and a page down key of a keyboard; a left click or right click of a mouse; movement of a position pointed by the mouse; an operation of turning a mouse wheel; a touch operation on a touch device; and so on. The operation information transmitted from the client terminal 100 is actually received by the OS execution unit 211 via the image transfer control unit 220.

The display screen generation unit 212 has a function of controlling execution of a user application (application execution control function) and a function of rendering an image in the frame buffer 213 (rendering processing function) in accordance with an instruction of the OS execution unit 211.

For example, the application execution control function causes a user application to operate when the application execution control function is instructed to start the user application or to execute a command on the running user application by the OS execution unit 211. Then, the application execution control function requests the rendering processing function to render, in the frame buffer 213, a display image of a processing result obtained by executing the user application. When making the rendering request in this manner, the application execution control function notifies the rendering processing function of the display image and a position where the display image is to be rendered.

Upon accepting the rendering request, the rendering processing function renders, in a bitmap format, the display image of the processing result of the user application at the rendering position specified by the application execution control function in the frame buffer 213. As a result, a desktop image including the display image is rendered.

Although the case where a rendering request is accepted from the application execution control function has been described, the rendering request from the OS execution unit 211 may be accepted. In an example, when accepting a request for rendering a mouse cursor from the OS execution unit 211, the rendering processing function renders, for example in a bitmap format, a display image of the mouse cursor at a rendering position specified by the OS execution unit 211 in the frame buffer 213. The mouse cursor may be rendered by the client terminal 100 instead of the server apparatus 200.

The frame buffer 213 stores image data of the desktop image rendered by the rendering processing function. For example, a RAM such as a video RAM (VRAM) or a semiconductor memory device such as a flash memory may be used as the frame buffer 213. Alternatively, a storage device such as an HDD or an optical disc may be used as the frame buffer 213.

The image transfer control unit 220 includes an image compression unit 221, a screen update determination unit 222, and an image transmission unit 223.

The image compression unit 221 acquires the image data of the desktop image from the frame buffer 213, and compresses (compresses and encodes) this image data. When acquiring the image data of the desktop image, the image compression unit 221 recognizes capture time indicating acquisition time of the image data. The capture time may be time at which the image data is generated and stored in the frame buffer 213. The image compression unit 221 outputs the compressed image data and the capture time to the image transmission unit 223.

For example, a digital-moving-image compression encoding method based on the H.264 standard is used in the compression processing. In addition to H.264, compression processing conforming to a standard of Moving Picture Experts Group-2 (MPEG-2), H.265, or the like may be performed. In the present embodiment, it is assumed that bidirectional prediction is not performed in the compression processing and only prediction in one direction (prediction based on the previous frame) is performed by way of example. It is thus assumed that the order of frames does not change before and after the compression processing.

When image data is acquired from the frame buffer 213 by the image compression unit 221, the screen update determination unit 222 determines a difference between the acquired image data (image data of the current frame) and image data of the previous frame, and determines whether or not there is a screen update. For example, if the number of pixels having different pixel values between the frames is greater than or equal to a threshold, the screen update determination unit 222 determines that there is a screen update. If the number of pixels is less than the threshold, the screen update determination unit 222 determines that there is no screen update. For example, the screen update determination unit 222 may determine the difference by comparing image data of a partial area of the current frame with image data of the corresponding partial area of the previous frame. The screen update determination unit 222 generates screen update information indicating a result of determination as to whether there is a screen update.

The image transmission unit 223 adds the capture time output from the image compression unit 221 and the screen update information output from the screen update determination unit 222, to the compressed image data output from the image compression unit 221, and transmits the resultant data to the client terminal 100 via the network 300. The compressed image data is transmitted as a compressed image stream. The capture time is added to the compressed image data as an example of reproduction time information used for controlling reproduction (display) timing in the client terminal 100.

Figure 5:
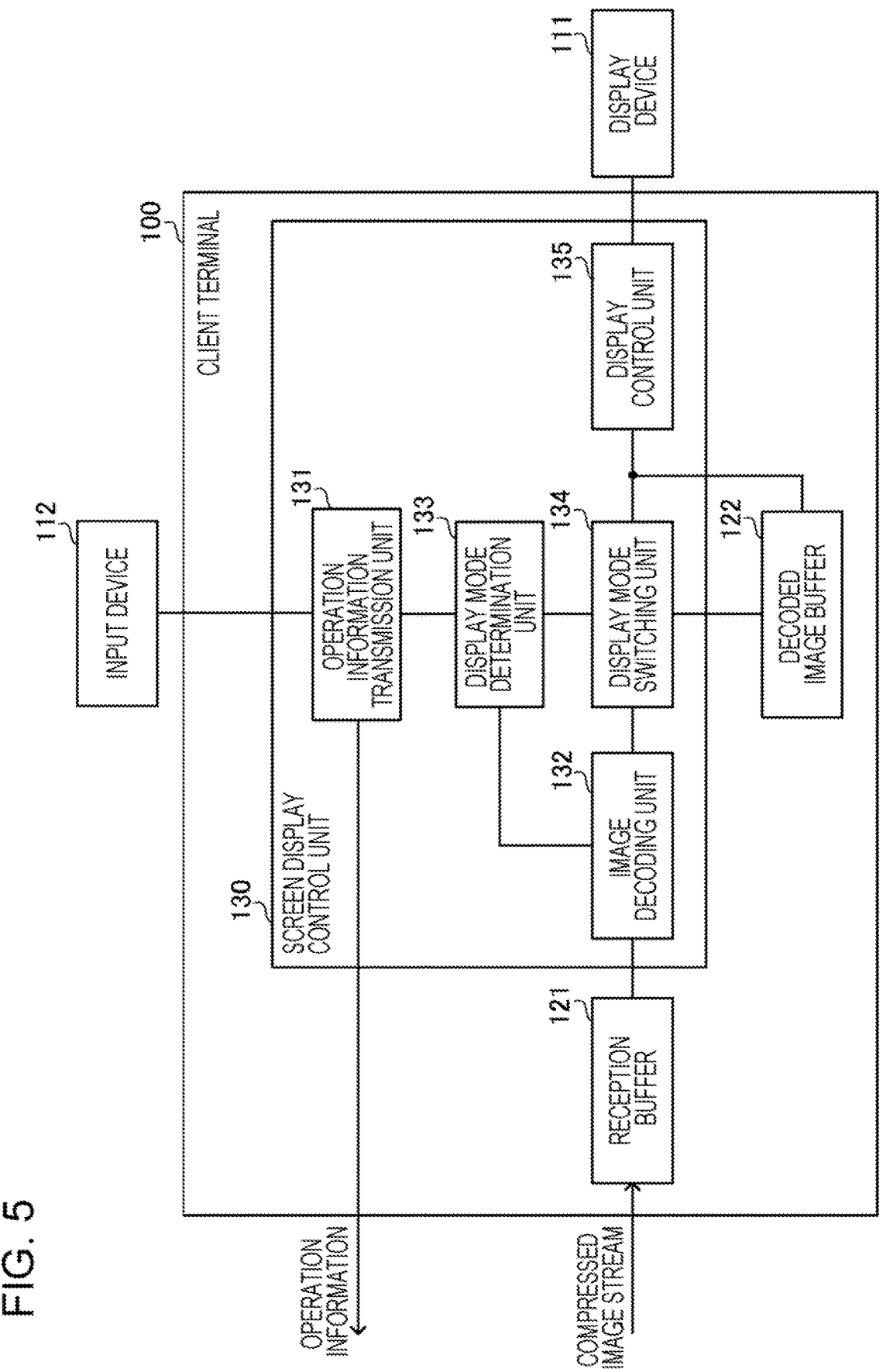
FIG. 5 is a block diagram illustrating an example of a configuration of processing functions of the client terminal.

FIG. 5 is a block diagram illustrating an example of a configuration of processing functions of the client terminal. The client terminal 180 includes a reception buffer 121, a decoded image buffer 122, and a screen display control unit 130.

The reception buffer 121 and the decoded image buffer 122 are each implemented by a storage area of a storage device included in the client terminal 100, such as the RAM 102, for example. The reception buffer 121 buffers data of a compressed image stream received from the server apparatus 200 via the network 300. The decoded image buffer 122 buffers decoded image data of a desktop image.

Processing performed by the screen display control unit 130 is implemented as a result of the processor 101 executing the screen display control application described above. The screen display control unit 130 transmits operation information indicating contents of an operation performed on the input device 112 to the server apparatus 200, and causes the display device 111 to, display a desktop image based on image data received from the server apparatus 200. As illustrated in FIG. 5, the screen display control unit 130 includes an operation information transmission unit 131, an image decoding unit 132, a display mode determination unit 3, a display mode switching unit 134, and a display control unit 135.

The operation information transmission unit 31 detects an operation performed on the input device 112, and transmits operation information indicating contents of the operation to the server apparatus 200. In practice, a driver for controlling the input device 112 detects an operation performed on the input device 112, and notifies the OS of the client terminal 100 of a message indicating contents of the operation. The OS then notifies the operation information transmission unit 131 of the message indicating the contents of the operation. In this way, the operation information transmission unit 131 recognizes that the operation has been performed and recognizes the contents of the operation. The operation information includes the operation type mentioned above. The operation information transmission unit 131 also outputs the operation information to the display mode determination unit 133.

The image decoding unit 132 reads compressed image data from the reception buffer 121, decodes (decompresses and decodes) the compressed image data, and outputs the decoded image data and the capture time added to the image data to the display mode switching unit 134. The image decoding, unit 132 also outputs the screen update information added to the image data to the display mode determination unit 133.

When the image data is decoded, the display mode determination unit 133 determines the display mode to be set, based on whether or not the operation information is received from the operation information transmission unit 131 and based on the screen update information received from the image decoding unit 132, and notifies the display mode switching unit 134 of the determination result. Whether or not the operation information is received is determined based on, for example, whether or not the operation information is received up until the current time point after the display mode is determined for the previous frame.

The display mode switching unit 134 performs processing for controlling the display timing of the desktop image based on the decoded image data output from the image decoding unit 132, in accordance with the display mode determined by the display mode determination unit 133. If it is determined that the small-delay display mode is to be set, the display mode switching unit 134 outputs the decoded image data to the display control unit 135 to instruct the display control unit 135 to immediately display the desktop image. If it is determined that the synchronous display mode is to be set, the display mode switching unit 134 stores the decoded image data in the decoded image buffer 122 and outputs the capture time to the display control unit 135 to instruct the display control unit 135 to display the desktop image at a timing corresponding to the capture time.

The display control unit 135 causes the display device 111 to display the desktop image based on the decoded image data, in accordance with the instruction from the display mode switching unit 134. In the small-delay display mode, the display control unit 135 causes the display device 111 to display the desktop image by using the image data output from the display mode switching unit 134. In the synchronous display mode, the display control unit 135 reads the image data from the decoded image buffer 122 and causes the display device 111 to display the desktop image.

<Determination as to Whether there is Operation>

Figure 6:
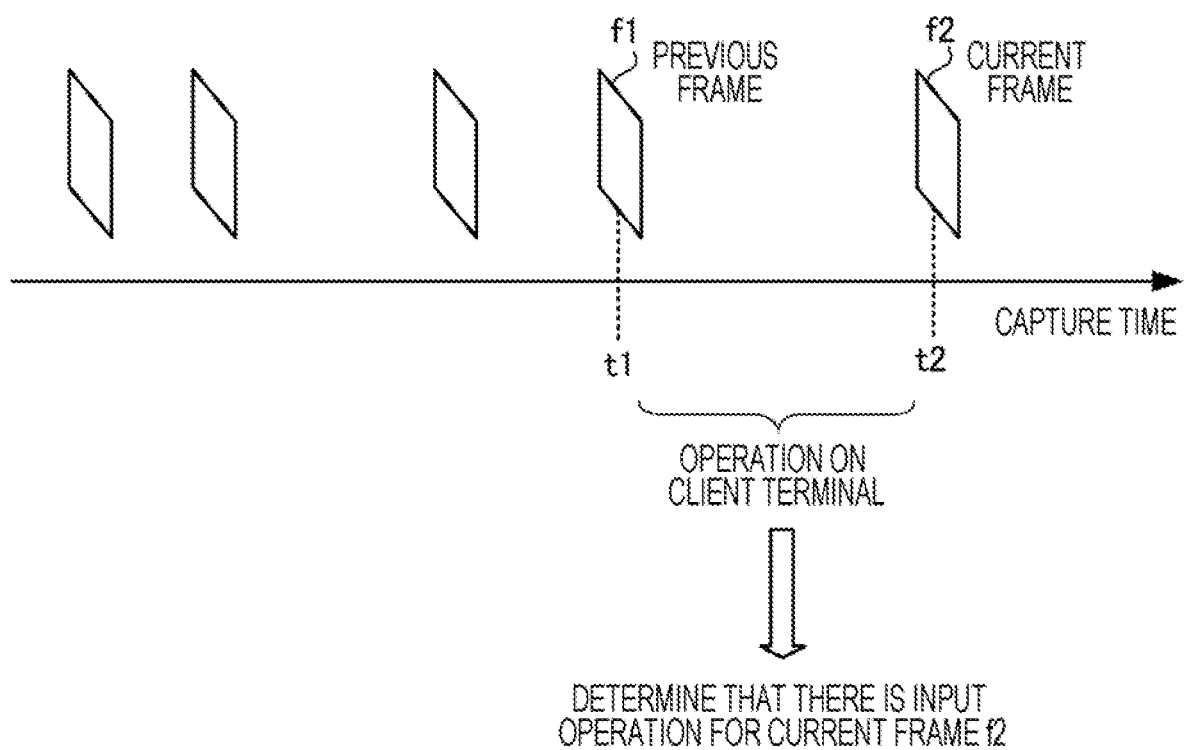
FIG. 6 is a diagram for describing an operation for determining whether or not there is an operation on an input device of the client terminal.

FIG. 6 is a diagram for describing an operation for determining whether or not there is an operation on the input device of the client terminal.

As described above, the display mode determination unit 133 of the client terminal 100 determines whether or not there is an operation on the input device 112 in order to determine the display mode. Ideally, whether or not there is an operation, which is determined by the display mode determination unit 133, indicates whether or not an operation is performed on the input device 112 in a period from generation of the desktop image of the previous frame to generation of the desktop image of the current frame. In the present embodiment, the generation time of the desktop image is represented by the capture time. For this reason, for example as illustrated in FIG. 6, it is determined that there is an input operation for a current frame f2 when an operation is performed on the input device 112 in a period from capture time (t1) of a previous frame f1 to capture time (t2) of the current frame f2.

In order to determine where or not there is an operation in such a manner, the display mode determination unit 133 stores, for example, operation information output from the operation information transmission unit 131 together with time of the operation in a storage device as an operation log. When image data is decoded by the image decoding unit 132, the display mode determination unit 133 refers to the operation log. The display mode determination unit 133 determines whether or not an operation is performed in a period between the capture time added to the decoded image data (image data of the current frame) and the capture time added to the image data of the previous frame, based on the operation log.

In order to simplify the processing, when image data is decoded by the image decoding unit 132, the display mode determination unit 133 may determine whether or not there is an operation, based on whether or not operation information is output from the operation information transmission unit 131 in a period from decoding of the image data of the previous frame to the current time point. In this case, however, there is a deviation between a timing at which the operation is actually performed and a timing at which the desktop image reflecting the operation is decoded. For this reason, for example, the operation information output from the operation information transmission unit 131 may be input to the display mode determination unit 133 with a certain delay.

The processing for determining whether or not there is an operation may be performed by the server apparatus 200. In this case, for example, when the desktop image of the current frame is generated, the server apparatus 200 determines whether or not there is an operation in a period from generation of the desktop image of the previous frame to the current time point. The server apparatus 200 adds operation presence/absence information indicating the determination result to the compressed image data corresponding to the desktop image of the current frame, and transmits the resultant data to the client terminal 100. The display mode determination unit 133 of the client terminal 100 successfully determines whether or not there is an operation based on the received operation presence/absence information.

<Operation in Small-Delay Display Mode and Operation in Synchronous Display Mode>

Figure 7:
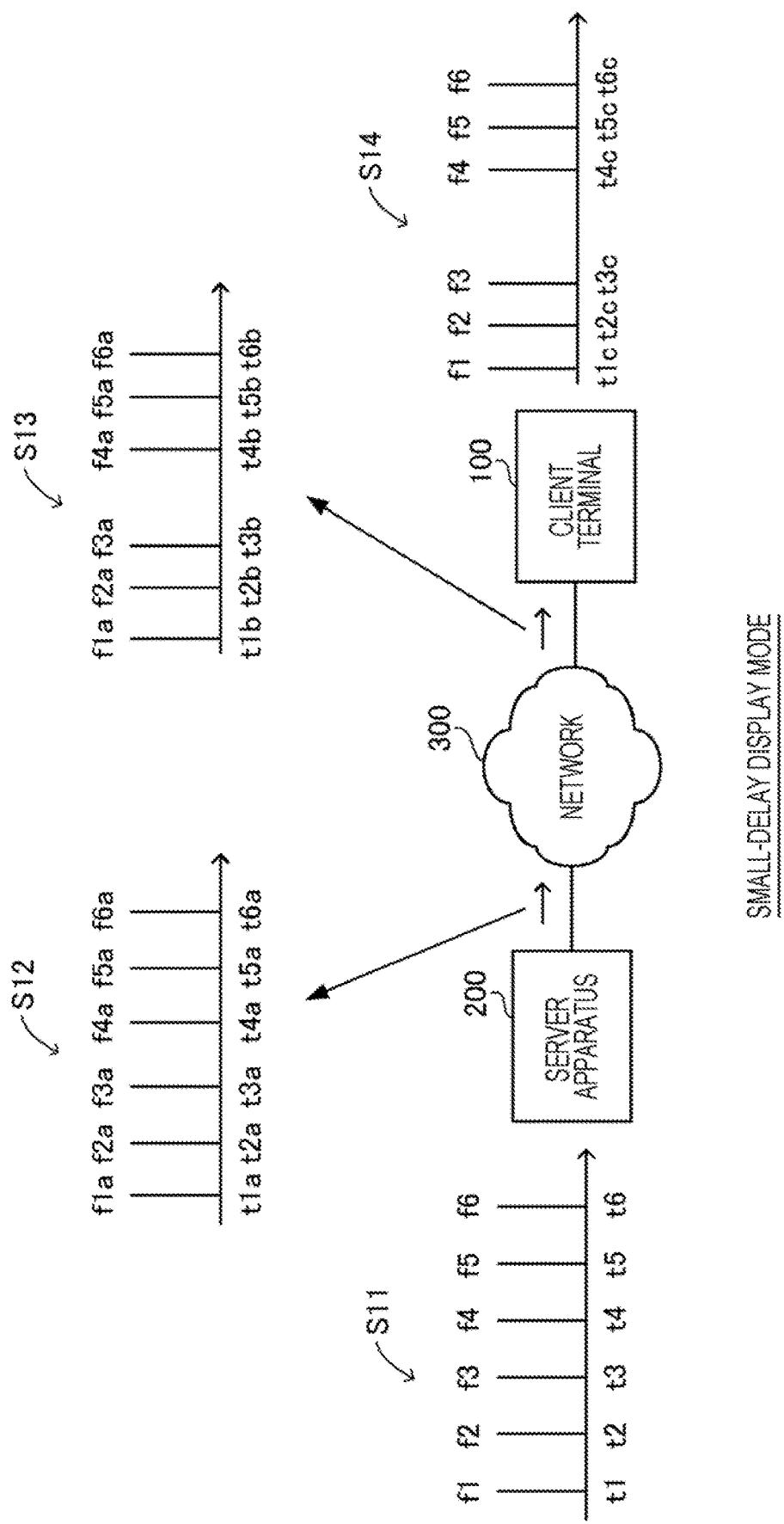
FIG. 7 is a diagram illustrating an example of an image data display operation in a small-delay display mode.

FIG. 7 is a diagram illustrating are example of an image data display operation in the small-delay display mode.

[Step S11] Pieces of image data of desktop images generated by the display screen generation unit 212 at a regular time interval are sequentially stored in the frame buffer 213 of the server apparatus 200. The image transfer control unit 220 acquires the pieces of image data of frames f1, f2, ..., f6 from the frame buffer 213 at times t1, t2, ..., t6, respectively. The times t1, t2, ..., t6 serve as the capture times of the respective frames, and the intervals between the times are equal to one another.

[Step S12] The image transfer control unit 220 compresses the pieces of image data of the frames f1, ..., f6 to generate pieces of compressed image data of frames f1a, f2a, ..., f6a. The image transfer control unit 220 transmits the generated pieces of compressed image data of the frames f1a, f2a, ..., f6a to the client terminal 100 via the network 300 at times t1a, t2a, ..., t6a, respectively, Since processing time taken for compressing image data may differ from one frame to another, intervals between the times t1a, t2a, ..., t6a may vary in some cases.

[Step S13] The screen display control unit 130 of the client terminal 100 receives the pieces of compressed image data of the frames t1a, t2a, ..., t6a at times t1b, t2b, ..., t6b, respectively. Depending on a load situation of the network 300 and a variation in the size of each of the pieces of compressed image data, time from transmission to reception may differ from one frame to another. Therefore, intervals between the times t1b, t2b, ..., t6b may further vary.

[Step S14] The screen display control unit 130 decodes the pieces of compressed image data of the frames t1a, t2a, ..., t6a, and completes the decoding of the respective pieces of image data at times t1c, t2c, ..., t6c, respectively. In the small-delay display mode, upon image data being decoded, a desktop image is immediately displayed based on the image data. Therefore, the display timings of the decoded frames f1, f2, ..., f6 are the times t1c, t2c, ..., t6c, respectively, which are the same as the times when decoding is completed. Since processing time taken for decoding image data may differ from one frame to another, intervals between the times t1c, t2c, ..., t6c may further vary.

Figure 8:
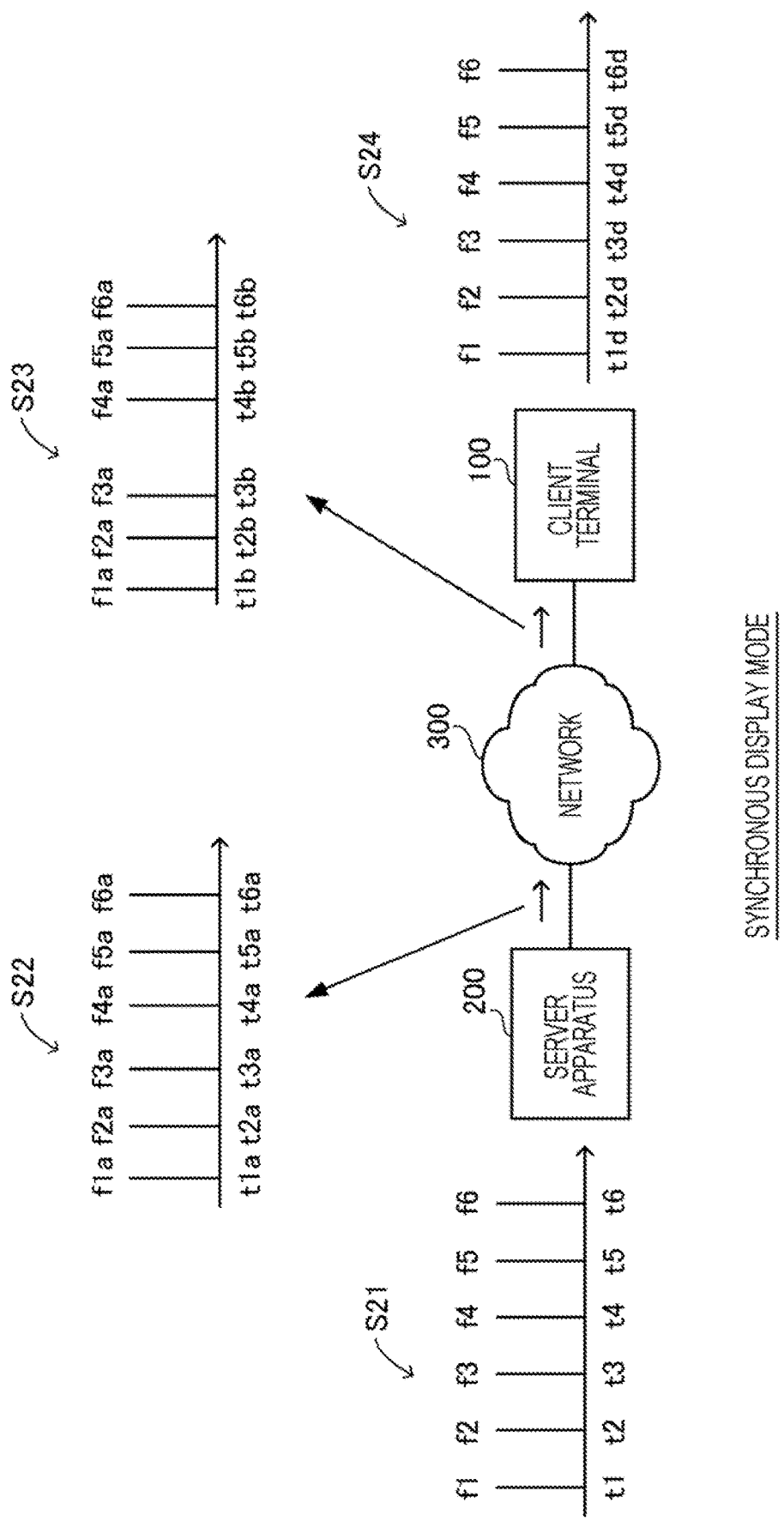
FIG. 8 is a diagram illustrating an example of an image data display operation in a synchronous display mode.

FIG. 8 is a diagram illustrating an example of an image data display operation in the synchronous display mode.

[Step S21] As in step S11 in FIG. 7, the image transfer control unit 220 of the server apparatus 200 acquires the pieces of image data of the frames f1, f2, ..., f6 from the frame buffer 213 at the times t1, t2, ..., t6, respectively. Intervals between the times t1, t2, ..., t6 are equal to one another.

[Step S22] As in step S12 in FIG. 7, the image transfer control unit 220 compresses the pieces of image data of the frames f1, ..., f6 to generate pieces of compressed image data of the frames t1a, t2a, ..., t6a, respectively. The image transfer control unit 220 transmits the generated pieces of compressed image data of the frames t1a, t2a, ..., t6a to the client terminal 100 via the network 300 at times t1a, t2a, ..., t6a, respectively.

[Step S23] As in step S13 in FIG. 7, the screen display control unit 130 of the client terminal 100 receives the pieces of compressed image data of the frames t1a, t2a, ..., t6a at times t1a, t2a, ..., t6a, respectively.

[Step S24] As in step S14 in FIG. 7, the screen display control unit 130 decodes the pieces of compressed image data of the frames f1a, f2a, ..., f6a, and completes decoding of the respective pieces of image data at times t1c, t2c, ..., t6c. In the synchronous display mode, the decoded image data is buffered in the decoded image buffer 122. Based on the capture times corresponding to the frames f1, f2, ..., f6, the screen display control unit 130 reads the pieces of image data of the frames f1, f2, ..., f6 at a regular time interval, and causes the display device 111 to display the desktop images based on the respective pieces of image data. Consequently, the frames f1, f2, ..., f6 are displayed at times t1d, t2d, ..., t6d, respectively, and intervals between the times t1d, t2d, ..., t6d are equal to one another. That is, the frames f1, f2, ..., f6 are displayed at a regular frame period.

Figure 9:
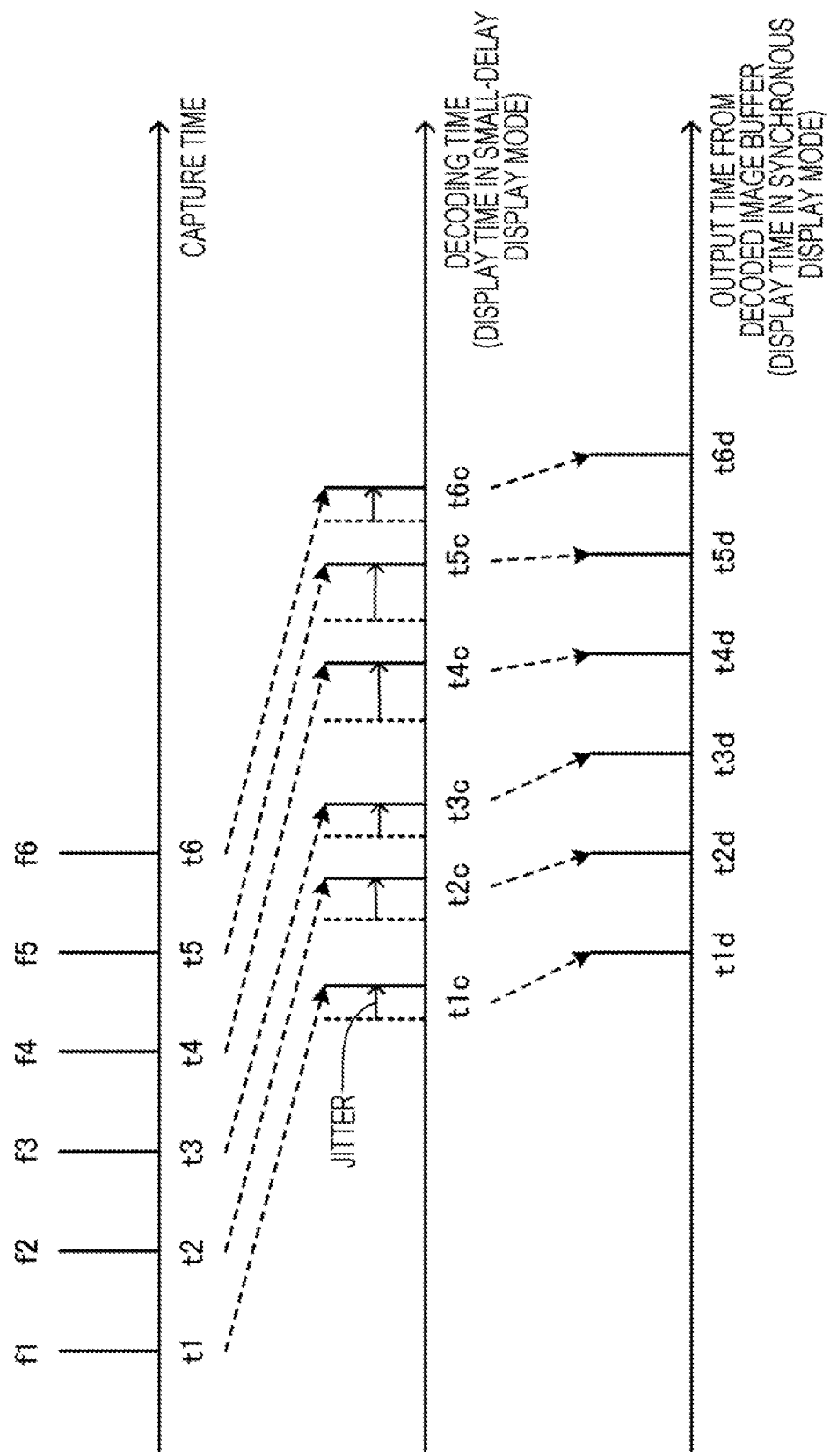
FIG. 9 is a diagram illustrating an example of display timings in the small-delay display mode and the synchronous display mode.

FIG. 9 is a diagram illustrating an example of display timings in the small-delay display mode and the synchronous display mode.

As described with reference to FIGS. 7 and 8, the pieces of image data of the frames f1, f2, ..., f6 are generated at the times t1, t2, ..., t6, respectively, in the server apparatus 200. Therefore, the capture times of the frames f1, f2, ..., f6 are the times t1, t2, ..., t6, respectively Intervals between the times t1, t2, ..., t6 are equal to one another.

As described in FIG. 7, the pieces of image data of the frames f1, f2, ..., f6 are decoded at the times t1c, t2c, ..., t6c, respectively, in the client terminal 100. Therefore, the frames f1, f2, ..., f6 are displayed at the times t1c, t2c, ..., t6c, respectively, in the small-delay display mode.

As described in FIG. 8, the pieces of image data of the frames f1, f2, ..., f6 are output from the decoded image buffer 122 at the times t1d, t2d, ..., t6d, respectively, in the synchronous display mode. Therefore, the frames f1, f2, ..., f6 are displayed at the times t1d, t2d, ..., t6d, respectively in the synchronous display mode. Intervals between the times t1d, t2d, ..., t6d are equal to one another.

As described above, in the small-delay display mode, the screen display control unit 130 causes a desktop image based on image data to be displayed immediately after decoding without buffering the decoded image data. Since the desktop image is displayed at the earliest timing From reception and decoding of the image data, the period from the capture time at the server side to the display time at the client side is the shortest. Therefore, the response of displaying, to a user operation, a desktop image reflecting processing corresponding to the operation is fast, and the operability for the user is high. However, display times of individual frames may become uneven due to jitter occurring during the compression/decoding processing or during the transmission. In such a case, there is a problem that images are not displayed smoothly and that the user visually feels strange.

On the other hand, in the synchronous display mode, the screen display control unit 130 buffers the pieces of decoded image data, and causes the desktop images based on the respective pieces of image data to be displayed in accordance with the frame period. Therefore, regardless of variations in time taken for compression/decoding of, the image frames and time taken for transfer via the network, smooth image display is implemented, enabling high-quality image display free from strangeness. However, since the image display time is delayed due to buffering, the response of displaying, to a user operation, a desktop image reflecting processing corresponding to the operation is slow.

As described above, both the display operations in the small-delay display mode and the synchronous display mode have an advantage and a disadvantage. Accordingly, for example, a method for selectively using one of the display modes in accordance with a user application running on the server apparatus 200 is conceivable.

For example, the small-delay display mode is suitable for user applications that are operated by a user with a high frequency. Examples of such user applications include office applications such as a word processing application, and various design applications using computer-aided design (CAD)/computer-aided engineering (CAE). On the other hand, the synchronous display mode is suitable for user applications that are operated by a user with a low frequency but whose screen is updated with a high frequency. Examples of such user applications include an application for reproducing a moving image content.

However, user applications that are suitable for either the small-delay display mode or the synchronous display mode are limited, and there are user applications for which the suitable display mode changes depending on the circumstance. For example, as for an application for editing a moving image content, the response to an operation is desirably fast during an editing operation. However, when the moving image is reproduced to confirm the result of editing, the operation is not performed. Thus, the fast response is not required; instead, it is desirable that the moving image be displayed naturally.

Therefore, the client terminal 100 according to the present embodiment mainly determines the state of the user operation independently of the user application, and adaptively, switches the display mode in accordance with the operation state. Specifically, when image data of one frame is decoded, the client terminal 100 determines whether or not there is an operation in a period from decoding of the previous frame to the current time point using the method described with reference to FIG. 6. If the client terminal 100 determines that there is an operation, the client terminal 100 sets the display mode to the small-delay display mode. If the client terminal 100 determines that there is no operation, the client terminal 100 sets the display mode to the synchronous display mode. Consequently, a delay in displaying of images is successfully suppressed with the small-delay display mode in a situation where a high-speed response is desired, and images are successfully displayed at a frame period in the synchronous display mode in a situation where natural image display is prioritized. Therefore, both high operability and high-quality image display are successfully achieved.

As more appropriate processing, the client terminal 100 may set the display mode to the small-delay display mode when image data of one frame is decoded, in the case where there are not only an operation but also a screen update in a period from decoding of the previous frame to the current time point. Consequently, for example, the display mode is not set to the small-delay display mode in the case where an operation for which neither a user application is requested to perform processing nor a large screen update is incurred, such as movement of a mouse or movement of a cursor position, is performed. For example, when such an operation is performed while the moving image content is being reproduced, the display mode is maintained in the synchronous display mode and the natural display is continued.

<Flowcharts>

Figure 10:
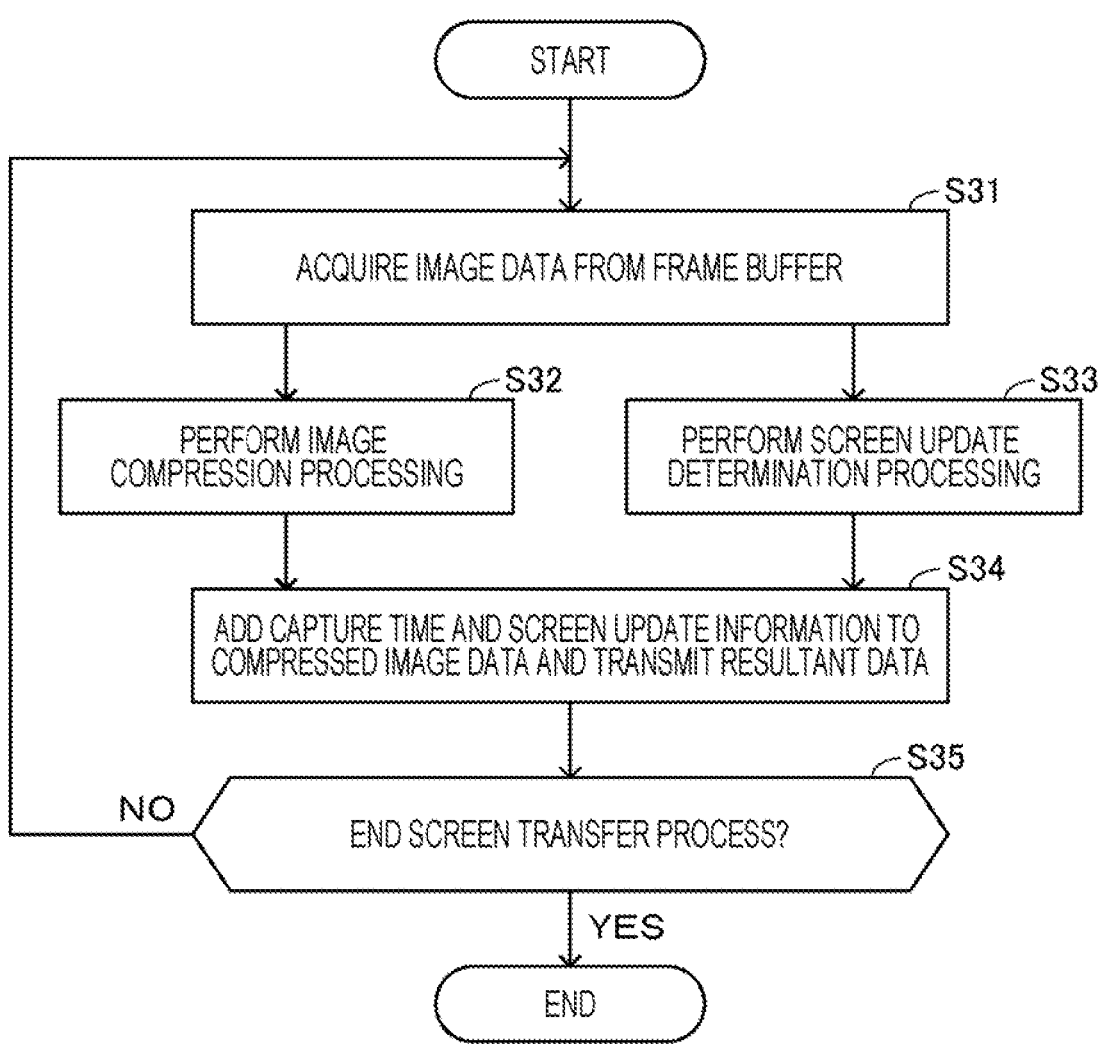
FIG. 10 is a flowchart illustrating an example of a process performed by the server apparatus.

FIG. 10 is a flowchart illustrating an example of a process performed by the server apparatus. As described above, image data of a desktop image generated by the display screen generation unit 212 is stored in the frame buffer 213 of the server apparatus 200 in accordance with the frame period.

[Step S31] The image transfer control unit 220 acquires the image data of the desktop image from the frame buffer 213.

[Step S32] The image compression unit 221 compresses (compresses and encodes) the image data acquired from the frame buffer 213. At that time, the image compression unit 221 recognizes the acquisition time of the image data from the frame buffer 213 as the capture time, and outputs the capture time, to the image transmission unit 223 together with the compressed image data.

[Step S33] The screen update determination unit 222 determines a difference between the image data acquired from the frame buffer 213 and image data of the previous frame, determines whether or not there is a screen update, and outputs screen update information indicating the determination result to the image transmission unit 223.

[Step S34] The image transmission unit 223 adds, to the compressed image data output from the image compression unit 221, the capture time output from the image compression unit 221 and the screen update information output from the screen update determination unit 222, and transmits the resultant data to the client terminal 100 via the network 300. The compressed image data is transmitted as a compressed image stream.

[Step S35] The image transfer control unit 220 determines whether or not to end a screen transfer process. If the image transfer control unit 220 determines to continue the screen transfer process, the process returns to step S31. If the image transfer control unit 220 determines to end the screen transfer process, the image transfer control unit 220 ends the process.

Figure 11:
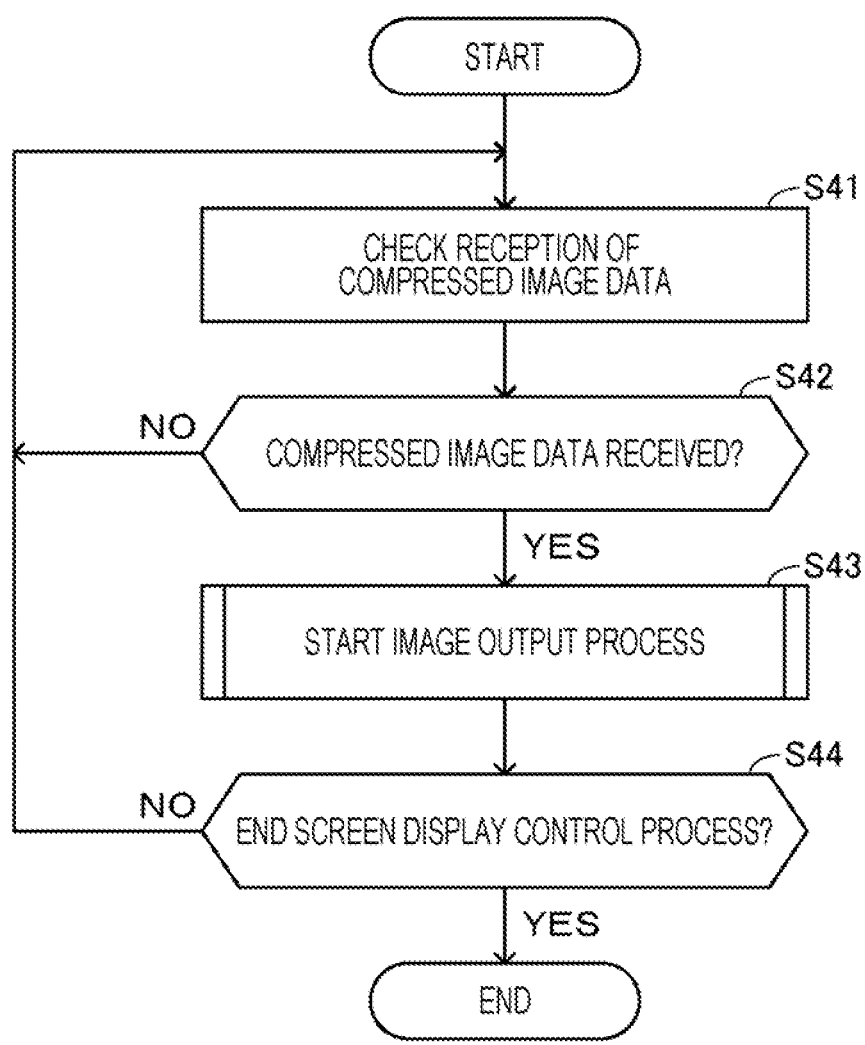
FIG. 11 is a flowchart illustrating an example of a process performed by the client terminal.

FIG. 11 is a flowchart illustrating an example of a process performed by the client terminal. Although not illustrated in FIG. 11, a compressed image stream that is transmitted from the server apparatus 200 and s received by the communication interface 107 of the client terminal 100 is stored in the reception buffer 121.

[Step S41] The image decoding unit 132 checks whether or not compressed image data of one frame has been received, that is, whether or not compressed image data of one frame has been stored in the reception buffer 121.

[Step S42] If the image decoding unit 132 determines that the compressed image data of one frame has been received, the process proceeds to step S43. If the image decoding unit 132 determines that reception of the compressed image data has not been completed, the image decoding unit 132 performs processing of step S41 again after a certain period.

[Step S43] The image decoding unit 132 reads the compressed image data of one frame from the reception buffer 121, and starts an image output process for the compressed image data. The image output process is performed in parallel with the process illustrated in FIG. 12. If the processing of step S43 is repeatedly performed, the image output processes are performed in parallel for the respective pieces of compressed image data (for respective frames).

[Step S44] The image decoding unit 132 determines wheat er to end the screen display control process. If the image decoding unit 132 determines to continue the screen display control process, the image decoding unit 132 performs the processing of step S41 after a certain period. If the image decoding unit 132 determines to end the screen display control process, the image decoding unit 132 ends the process.

Figure 12:
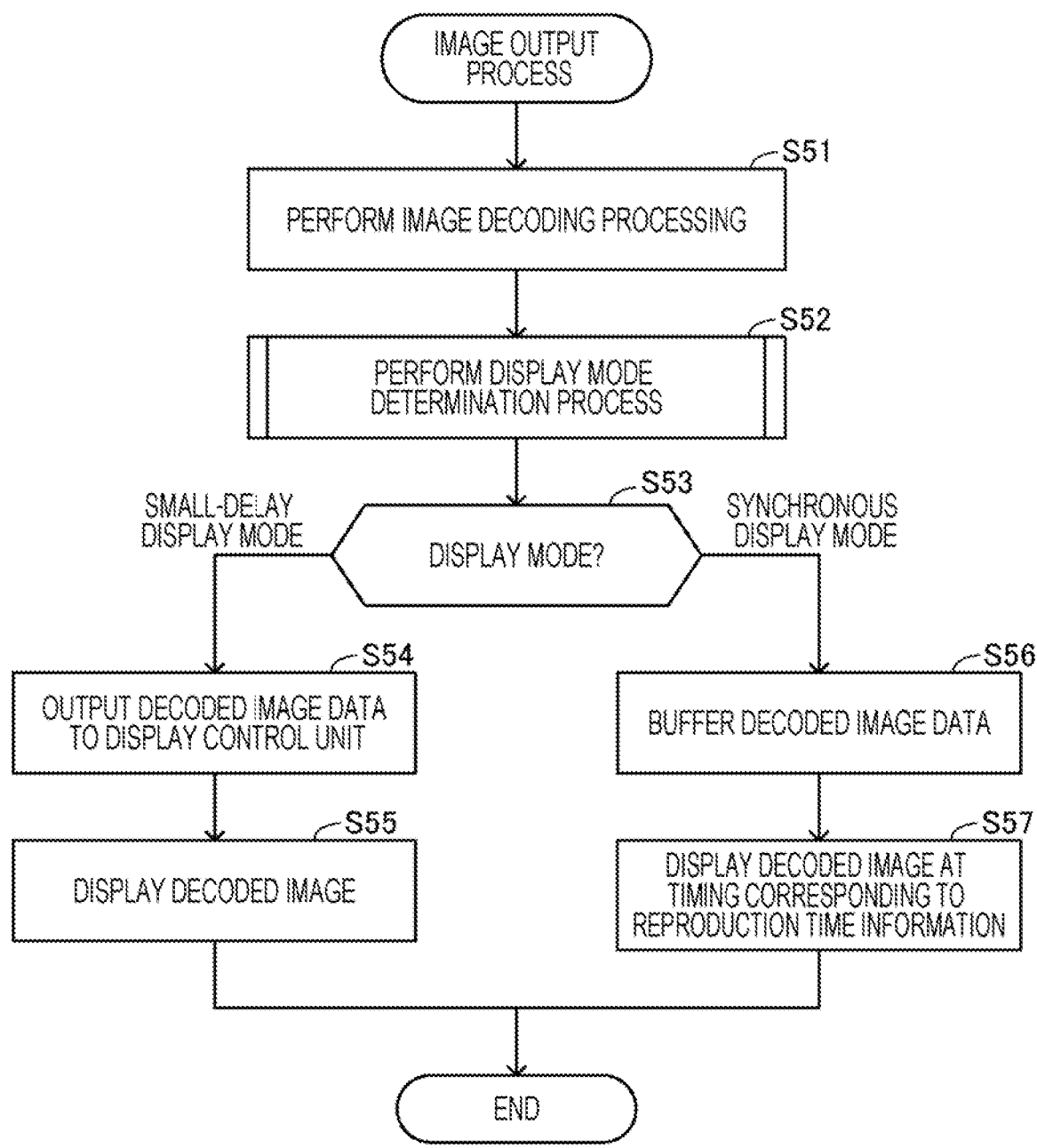
FIG. 12 is a flowchart illustrating air example of an image output process.

FIG. 12 is a flowchart illustrating an example of the image, output process. The process illustrated in FIG. 12 is performed in response to a start instruction given in step S43 of FIG. 11.

[Step S51] The image decoding unit 132 decodes (decompresses and decodes) the compressed image data read from the reception buffer 121. The image decoding unit 132 outputs the decoded image data and the capture time added to the image data to the display mode switching unit 134.

The image decoding unit 132 also outputs the screen update information added to the image data to the display mode determination unit 131.

[Step S52] Based on the operation information supplied from the operation information transmission unit 131 and the screen update information supplied from the image decoding unit 132 the display mode determination unit 133 determines the display mode and notifies the display mode switching unit 134 of the determined display mode. A display mode determination process will be described in detail later with reference to FIG. 13.

[Step S53] If the display mode that the display mode switching unit 134 is notified of by the display mode determination unit 133 is the small-delay display mode, the process proceeds to step S54. If the notified display mode is the synchronous display mode, the process proceeds to step S56.

[Step S54] The display mode switching unit 134 outputs, to the display control unit 135, the decoded image data output from the image decoding unit 132 to instruct the display control unit 135 to immediately display the corresponding image.

[Step S55] The display control unit 135 causes the display device 111 to display a decoded image, that is, a desktop image, based on the decoded image data output from the display mode switching unit 134.

[Step S56] The display mode switching unit 134 stores the decoded image data output from the image decoding unit 132 in the decoded image buffer 122 to buffer the decoded image data. The display mode switching unit 134 notifies the display control unit 135 of the capture time output from the mage decoding unit 132, and instructs the display control unit 135 to display the image at a timing corresponding to the capture time.

[Step S57] The display control unit 135 reads the decoded image data from the decoded image buffer 122 at a timing corresponding to the capture time output from the display mode switching unit 134, and causes the display device 111 to display the decoded image, that is, the desktop image, based on the decoded image data.

For example, when displaying the first desktop image in the synchronous display mode, the display control unit 135 calculates display time by adding certain time to the capture time of the desktop image. The certain time to be added is determined in advance based on expected time taken from generation of image data of a desktop image to decoding of the image data and buffering time in the decoded image buffer 122. When the current time reaches the calculated display time, the display control unit 135 reads the decoded image data from the decoded image buffer 122, and causes the display device 111 to display the desktop image based on the decoded image data.

Each time the display control unit 135 causes the desktop image to be displayed, the display control unit 135 stores the capture time of the desktop image (previous capture time) and the display time of the desktop image (previous display time) in the RAM 102. For the second and subsequent times, the display control unit 135 calculates a difference between the capture time output from the display mode switching unit 134 and the stored previous capture time, and adds the difference to the stored previous display time to calculate the display time. Upon the current time reaching the calculated display time, the display control unit 135 reads the decoded image data from the decoded image buffer 122 and causes the display device 111 to display the desktop image based on the decoded image data.

Alternatively, the display control unit 135 may acquire capture the information for all frames from the display mode switching unit 134, and may count reproduction control time corresponding to the system time clock (STC) of an MPEG system based on the capture time information. In this case, when the capture time corresponding to the buffered decoded image data matches the counted reproduction control time, the display control unit 135 reads the decoded image data from the decoded image buffer 122 and causes the display device 111 to display the desktop image.

In the present embodiment, the capture time is added to each frame. Instead of the capture time, time at a regular interval starting from given reference time may be added to each frame in the server apparatus 200.

Figure 13:
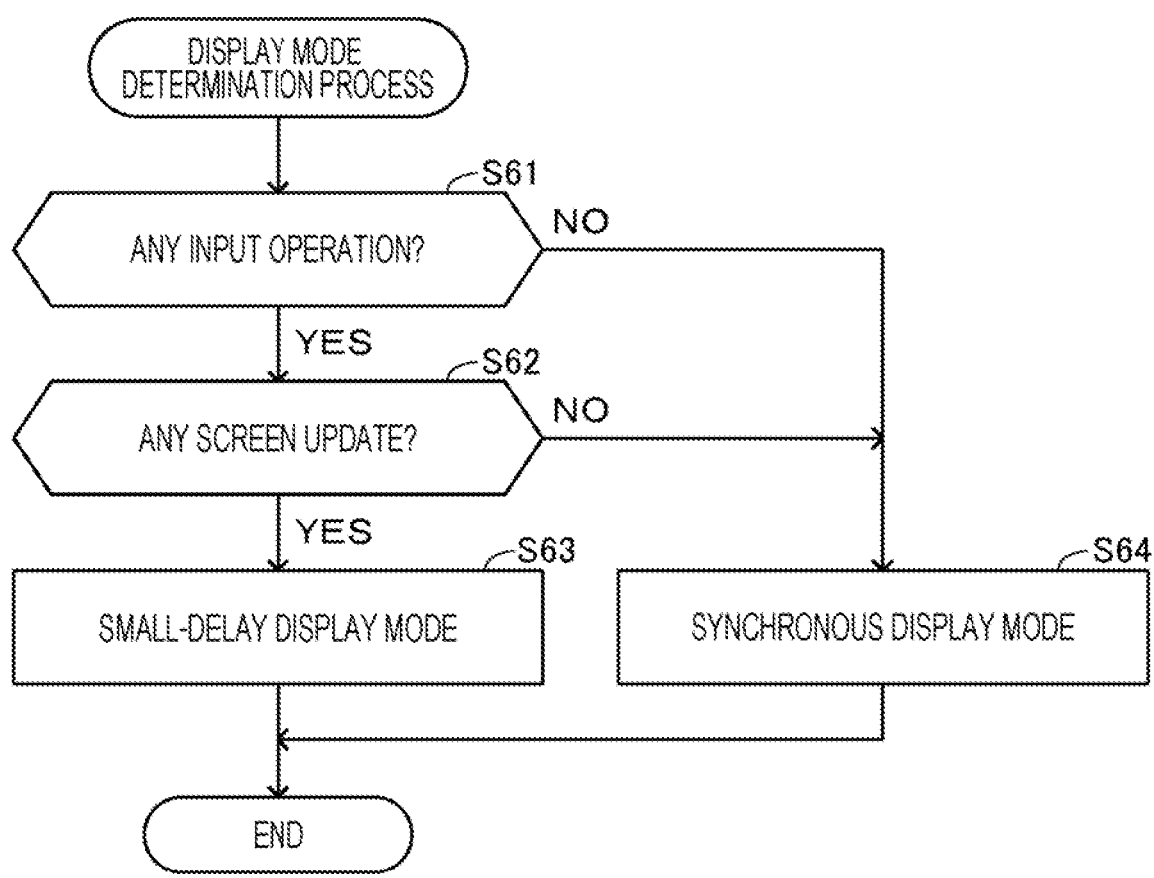
FIG. 13 is a flowchart illustrating an example of a display mode determination process.

FIG. 13 is a flowchart illustrating an example of the display mode determination process. The process illustrated in FIG. 13 corresponds to the processing in step S52 in FIG. 12.

[Step S61] The display mode determination unit 133 determines whether or not there is an input operation (whether or not operation information is output from the operation information transmission unit 131) in a period from completion of decoding of the previous frame to the current time point. If the display mode determination unit 133 determines that there is an input operation, the process proceeds to step S62. If the display mode determination unit 133 determines that there is no input operation, the process proceeds to step S64.

[Step S62] The display mode determination unit 133 determines whether or not there is a screen update, based on screen update information supplied from the image decoding unit 132. If the display mode determination unit 133 determines that there is a screen update, the process proceeds to step S63. If the display mode determination unit 133 determines that there is no screen update, the process proceeds to step S64.

[Step S63] The display mode determination unit 133 notifies the display mode switching unit 134 of the small-delay display mode as the display mode determination result.

[Step S64] The display mode determination unit 133 notifies the display mode switching unit 134 of the synchronous display mode as the display mode determination result.

The process illustrate in FIG. 13 may be modified as follows. For example, in step S61, it may be determined whether or not there is an input operation on an active window in the desktop image in a period from completion of decoding of the previous frame to the current time point. In this way, it may be highly accurately determined whether or not an input operation for causing a change that is important for the user in the desktop image is performed. In another example, in step S61, it may be determined whether or not there is a specific type of input operation in a period from completion of decoding of the previous frame to the current time point. For example, an operation for moving a mouse and an operation for moving a cursor position are excluded from the specific type of input operation. In this way, it may be highly accurately determined whether or not there is an input operation for instructing a user application to perform processing. In any of these cases, the processing in step S63 may be skipped. In this case, the display mode may be switched more appropriately than in the case where the display mode is determined based solely on whether or not there is an input operation.

According to the second embodiment described above, the small-delay display mode and the synchronous display mode may be adaptively switched between in accordance with the state of a user operation on the client terminal 100 independently of a user application used by the user. For example, the small-delay display mode is set in a situation where an input operation for causing an important change in the desktop image is performed. In this way, the image display response to the operation may be made faster. In a situation where such an input operation is not performed, the synchronous display mode is set. In the way smooth and natural image display may be implemented. Consequently, both improved operability and improved image display quality are successfully achieved.

For example, in the case where the user uses an application for editing a moving image content, the desktop images are displayed in the small-delay display mode without being buffered when the user is performing the editing operation. Consequently, the response to the operation becomes fast and efficient editing work is enabled. When the user reproduces the moving image to check the result of the editing, the desktop images are displayed in the synchronous display mode in which buffering is performed. Consequently, smooth moving image display may be implemented in an ordinary frame period as in the local environment.

The processing functions of the apparatuses (for example, the information processing apparatus 1, the client terminal 100, and the server apparatus 200) described above in each of the embodiments may be implemented by a computer. In such a case, a program in which processing contents of the functions which each of the apparatuses is equipped with are written is provided to a computer, and the computer executes the program. Consequently, the functions described above are implemented on the computer. The program in which the processing contents are written may be stored on a computer-readable recording medium. Examples of the computer-readable recording medium include a magnetic storage device, an optical disc, a magneto-optical recording medium, and a semiconductor memory. Examples of the magnetic storage device include an HDD and a magnetic tape. Examples of the optical disc include a compact disc (CD), a digital versatile disc (DVD), and a Blu-ray Disc (BD, registered trademark), Examples of the magneto-optical recording medium include a magneto-optical disk (MO).

When the program is distributed, for example, a removable recording medium such as a DVD or a CD-read-only memory (ROM) on which the program is recorded is sold. The program may be stored in a storage device of a server computer and may be transferred from the server computer to another computer via a network.

A computer that executes the program stores the program recorded on the removable recording medium or the program transferred from the server computer, for example, in a storage device thereof. The computer then reads the program from the storage device thereof and performs processing according to the program. The computer may also directly read the program from the removable recording medium and perform processing according to the program. Each time a program is transferred from the server computer coupled to the computer via the network, the computer may sequentially perform processing according to the received program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:
   receiving pieces of image data of respective frames from a server apparatus, each of the pieces of image data representing a display screen reflecting a result of processing corresponding to an input operation performed on the computer; and
   in response to reception of a piece of image data of a first frame among the frames from the server apparatus, controlling a display timing of the first frame, based on an occurrence state of an input operation on the computer,
   the occurrence state indicates whether or not an input operation is performed on the computer in a period from generation of a second frame immediately preceding the first frame to generation of the first frame;
   in a first occurrence state indicating that the input operation is not performed on the computer in the period, the first frame is displayed on the computer at a timing that is synchronized with a predetermined frame period; and
   in a second occurrence state indicating that the input operation is performed on the computer in the period, the first frame is displayed on the computer at a timing that is not synchronized with the predetermined frame period to make a display timing of the first frame sooner than a display timing of the first frame in the first occurrence case.

2. The non-transitory, computer-readable recording medium of claim 1, wherein the controlling includes determining, based on the occurrence state, whether to display the first frame at a timing that is synchronized with a predetermined frame period or at a timing that is not synchronized with the predetermined frame period.

3. The non-transitory, computer-readable recording medium of claim 2, wherein when the first frame is displayed at the timing that is synchronized with the predetermined frame period, a display timing of the first frame is determined based on reproduction time information added to the piece of image data of the first frame.

4. The non-transitory, computer-readable recording medium of claim 1, wherein the controlling includes determining, based on the occurrence state, whether to display the first frame at a timing that is synchronized with a predetermined frame period after buffering the piece of image data of the first frame, or to display the first frame without buffering the piece of image data of the first frame.

5. The non-transitory, computer-readable recording medium of claim 1, wherein the occurrence state indicates whether or not an input operation is performed on the computer in a period from generation of a second frame immediately preceding the first frame to generation of the first frame.

6. The non-transitory, computer-readable recording medium of claim 1, wherein the controlling the display timing of the first frame is performed based on the occurrence state and a screen update state of the first frame with respect to a second frame immediately preceding the first frame.

7. The non-transitory, computer-readable recording medium of claim 1, wherein a display screen data which is a result of processing performed by the server apparatus and to be displayed on a client terminal including the computer is transferred to the client terminal as image data.

8. A method performed by a computer, the method comprising:
- receiving pieces of image data of respective frames from a server apparatus, each of the pieces of image data representing a display screen reflecting a result of processing corresponding to an input operation performed on the computer; and
- in response to reception of a piece of image data of a first frame among the frames from the server apparatus, controlling a display timing of the first frame, based on an occurrence state of an input operation on the computer,
- the occurrence state indicates whether or not an input operation is performed on the computer in a period from generation of a second frame immediately preceding the first frame to generation of the first frame;
- in a first occurrence state indicating that the input operation is not performed on the computer in the period, the first frame is displayed on the computer at a timing that is synchronized with a predetermined frame period; and
- in a second occurrence state indicating that the input operation is performed on the computer in the period, the first frame is displayed on the computer at a timing that is not synchronized with the predetermined frame period to make a display timing of the first frame sooner than a display timing of the first frame in the first occurrence case.

9. An apparatus comprising:
- a memory; and
- a processor coupled to the memory and configured to:
- receive pieces of image data of respective frames from a server apparatus, each of the pieces of image data representing a display screen reflecting a result of processing corresponding to an input operation performed on the apparatus, and
- in response to reception of a piece of image data of a first frame among the frames from the server apparatus, control a display timing of the first frame, based on an occurrence state of an input operation on the apparatus,
- the occurrence state indicates whether or not an input operation is performed on the computer in a period from generation of a second frame immediately preceding the first frame to generation of the first frame;
- in a first occurrence state indicating that the input operation is not performed on the computer in the period, the first frame is displayed on the computer at a timing that is synchronized with a predetermined frame period; and
- in a second occurrence state indicating that the input operation is performed on the computer in the period, the first frame is displayed on the computer at a timing that is not synchronized with the predetermined frame period to make a display timing of the first frame sooner than a display timing of the first frame in the first occurrence case.

* * * * *